United States Patent [19]

Lukey

[11] 4,125,244
[45] Nov. 14, 1978

[54] RETROVISORS

[75] Inventor: Leonard F. Lukey, Mentone, Australia

[73] Assignee: Fifth Patroy Proprietary Limited, Victoria, Australia

[21] Appl. No.: 732,064

[22] Filed: Oct. 13, 1976

[30] Foreign Application Priority Data

Oct. 13, 1975 [AU] Australia ............................... 3547/75

[51] Int. Cl.² ............................................. B60R 1/06
[52] U.S. Cl. ................................. 248/475 B; 248/478
[58] Field of Search ............... 248/475 A, 475 B, 478, 248/479, 481, 483, 487

[56] References Cited

U.S. PATENT DOCUMENTS

| 2,533,475 | 12/1950 | Koonter | 248/475 B |
| 3,130,925 | 4/1964 | Appleton | 248/475 R |
| 3,189,309 | 6/1965 | Hager | 248/478 |
| 3,637,186 | 1/1972 | Greenfield | 248/478 |
| 3,730,474 | 5/1973 | Bowers | 248/475 B |

FOREIGN PATENT DOCUMENTS

| 1,430,355 | 9/1969 | Fed. Rep. of Germany | 248/479 |
| 1,044,921 | 10/1966 | United Kingdom | 248/475 B |
| 1,096,463 | 12/1967 | United Kingdom | 248/481 |

Primary Examiner—William H. Schultz
Attorney, Agent, or Firm—Lowe, King, Price & Becker

[57] ABSTRACT

A retrovisor, or rear vision mirror for automobiles, having a frame which may be supported on a mount for securing said retrovisor to a vehicle, said mounting and said frame having interengagable ratchet means such that upon the frame being resiliently mounted on the support with the ratchets interengaged, the frame will be held in a set position but will swing towards the vehicle if struck by an obstacle.

7 Claims, 7 Drawing Figures

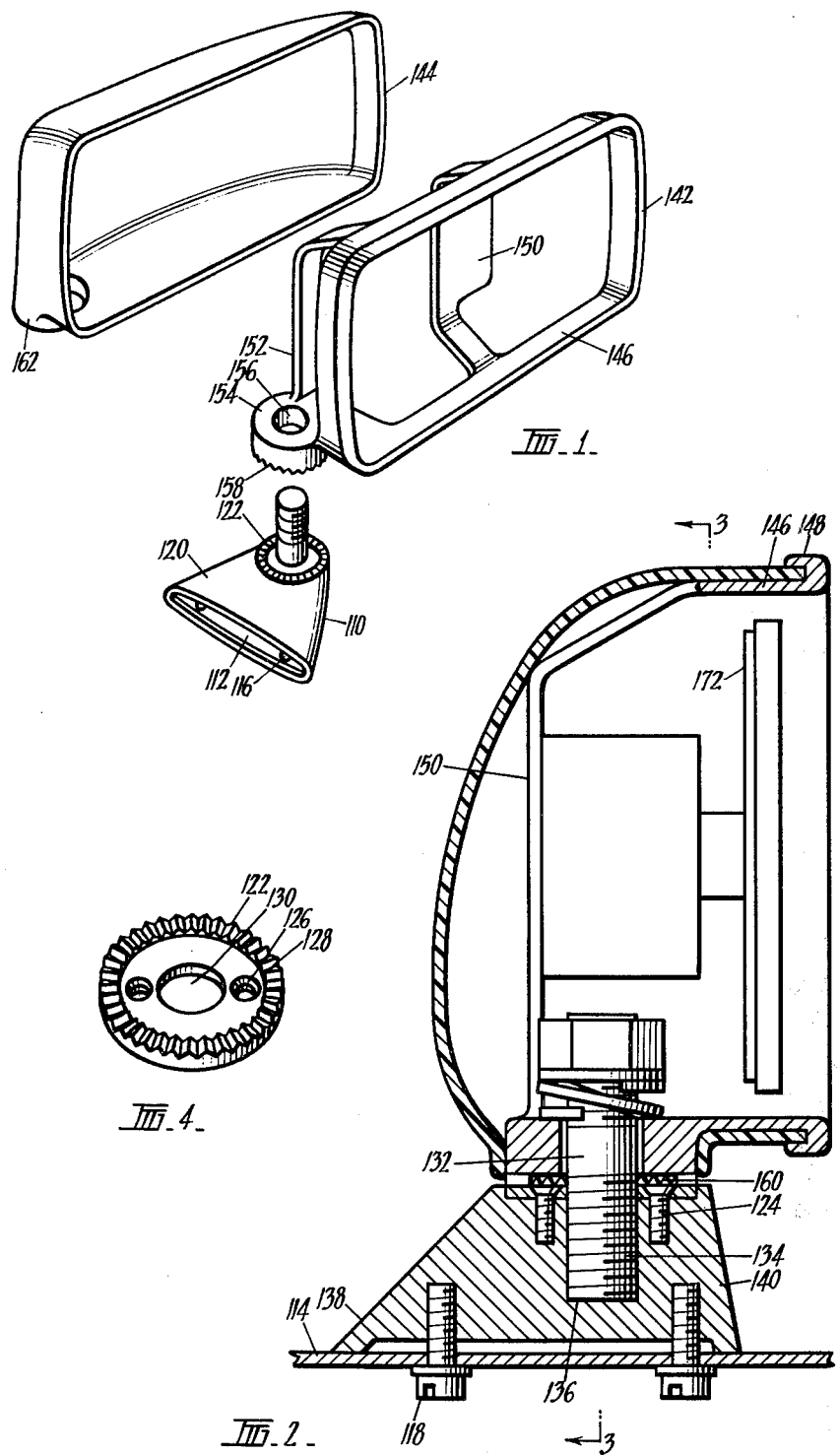

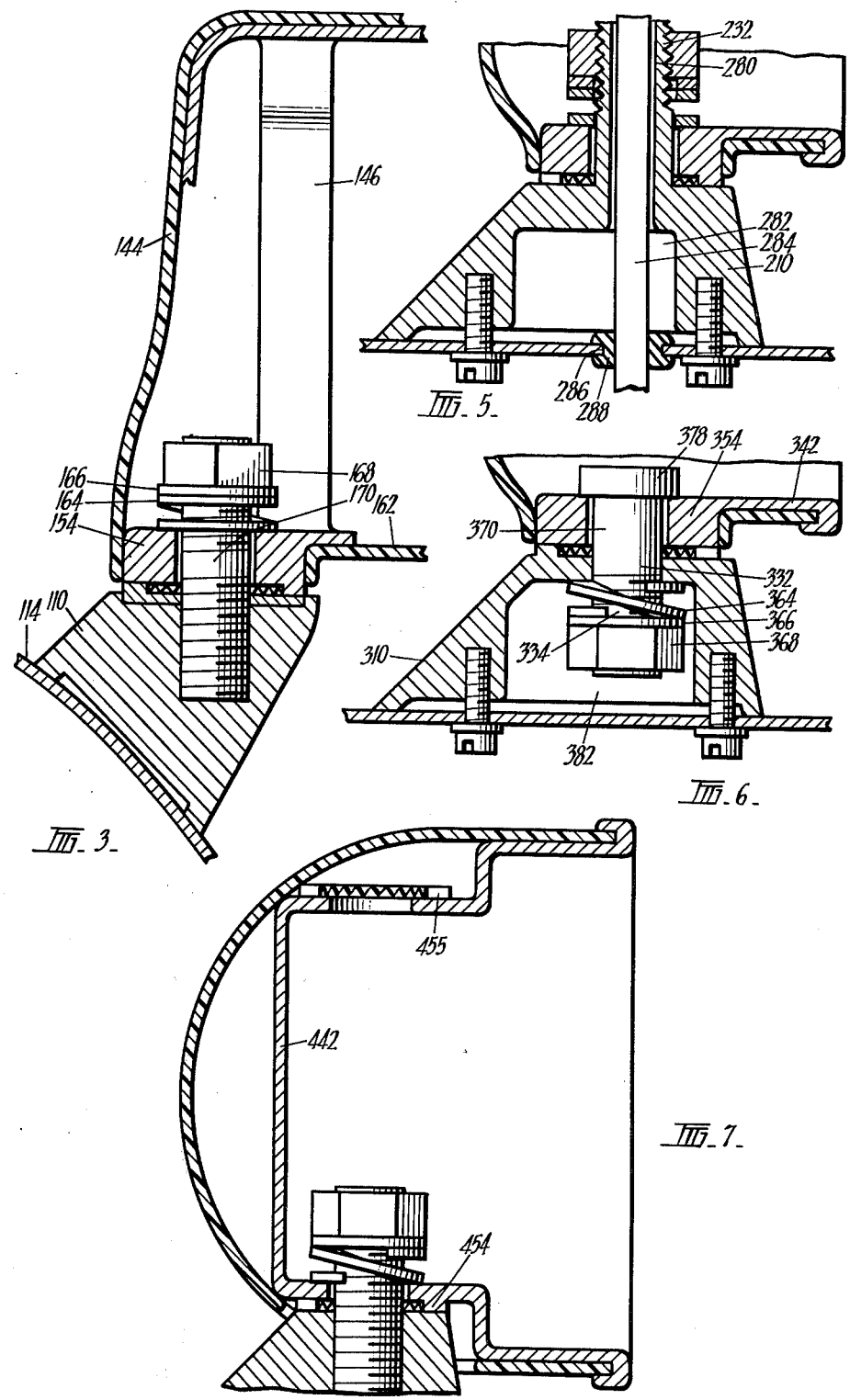

RETROVISORS

FIELD OF THE INVENTION

This invention relates to retrovisors and refers particularly, though not exclusively, to externally-mounted rear vision mirrors for automobiles, motor cycles, and other vehicles.

With the ever increasing use of externally-mounted rear vision mirrors on automobiles, it has been deemed necessary by some authoritories to legislate standards so as to protect pedestrians who may be hit by such a mirror. The normal requirement of such legislation is that the mirror must swing away if contacted by any reasonably solid object, such as a pedestrian, above a relatively low speed. This has caused many inherent problems due to one of the principal requirements by the user of such mirrors is that they be rigidly mounted so as to prevent unwanted vibrations and movements.

Another problem exists with such mirrors in the production stage in that the mirrors are required to have housings of differing shapes so as to provide for differing makes and models of automobiles. This has lead to high production costs and hence high consumer pricing.

DESCRIPTION OF INVENTION

It is therefore the principal object of the present invention to provide an externally mountable rear vision mirror for vehicles which will be firmly supported when mounted in position but which will swing in towards the side of the vehicle when struck by an obstacle, and be capable of being moved back to initial position.

Another object of the present invention is to a retrovisor for vehicles whereby a range of shapes of housing may be provided for the one basic unit.

With the above and other objects in mind, the present invention provides a retrovisor comprising a frame mountable in a mount for securing said retrovisor to a vehicle, said mounting and said frame having interengagable ratchet means such that upon the frame being resiliently mounted on the support with the ratchets interengaged, the frame will be held in a set position but will swing toward the vehicle if struck by an obstacle.

Advantageously, the frame is adapted to hold in position any one of a number of different housings, which may be of different shapes, colours, or materials.

DESCRIPTION OF DRAWINGS

In order that the invention may be clearly understood and readily put into practical effect, there shall now be described preferred constructions of retrovisors according to the present invention, the description being by way of non-limitative example only and, with reference to the accompanying illustrative drawings.

In the drawings:

FIG. 1 is an exploded perspective view of a first embodiment;

FIG. 2 is a vertical cross-section through the assembled embodiment of FIG. 1;

FIG. 3 is a partial cross-section along the lines of and in the direction of arrows 3—3 of FIG. 2;

FIG. 4 is a perspective view of a ratchet of the first embodiment;

FIG. 5 is a partial cross-section showing a second embodiment;

FIG. 6 is a partial cross-section showing a third embodiment; and

FIG. 7 is a partial cross-section showing a fourth embodiment.

DESCRIPTION OF PREFERRED EMBODIMENTS

Throughout this specification like parts are given like numbers, with the prefix number denoting the particular embodiment concerned. Thus, for example, the mounting of FIGS. 1 to 4 is denoted 110, in FIG. 5 is denoted 210, in FIG. 6 is denoted 310, and so forth.

Referring to FIGS. 1 to 4, the particular form of the invention the mounting 110 cosists of a metallic mounting member having an inner surface 112 shaped to register with a portion of the external surface 114 of the motor vehicle (not shown) to which the mounting 110 is to be affixed, and having suitable attachment holes 116 to enable fastening means 118 to be secured through the side 114 of the vehicle and engaged in the mounting 110. The upper surface 120 of the mounting is substantially flat, and it has a ratchet plate 122 of circular shape recessed into that surface 120. The ratchet plate 122 may be held in position by one, two or more screws 124 engaged through the ratchet plate 122 and engaging in tapped holes 126 in the mounting 110. The ratchet plate 122 is so arranged that the circularly arranged teeth 128 of the ratchet 122 extend a small distance above the upper surface 120 of the mounting 110.

Coaxial with the ratchet plate 122 is a tapped hole 130 into which is engaged a screw threaded stem in the form of a rod 132 having its opposite ends screw threaded. The lower end 134 is engaged in the tapped hole 136 in the mounting 110.

The external surface of the mounting may be made of a suitable pleasing appearance, as of curved shape having the rear or trailing edge 138 inclined a small amount rearwardly and downwardly from the vertical, and the front or leading edge 140 inclined downwardly and forwardly from the vertical.

The frame 142 for the mirror housing 144 has a substantially rectangular frame member 146 which may be and suitable proportions — such as the vertical height being half the horizontal side ways dimension.

There is a bead 148 around the rear edge of this frame member 146, and at the rear of the frame member 146 are two bows 150 which extend rearwardly in spaced relationship, so that in end view of the frame 142 with the two bows 150 has the appearance of a reversed letter "D". At about the inner end 152 of the frame 192 there is a mounting block 154 having through it a vertical hole 156 for the reception of the pivot stem 132. On the under surface of that mounting block 154 is a ratchet plate 158, circular in shape and having a central hole 160 therethrough, of a size and construction to register with the ratchet plate 122 on the upper surface 120 of the mounting 110. This ratchet plate 158 may be secured in position by one, two or more screws or may be integral with mounting block 154.

The mirror housing 144 is made of a shape and size adapted to fit over the front portion of the frame member 146. At the inner end of the housing 144 there is shaped part 162 adapted to fit about the mounting block 154 at the inner end part 152 of the frame 142. The two bows 150 of the frame 142 provides supports at spaced locations for the housing 144.

In the assembly of the mirror housing 144, the frame 142 and the mounting 110, the upwardly extending stem 132 of the mounting 110 is engaged through the hole 156 in the mounting block 154 of the frame 142, and then a spring washer onspring 164, a plain washer 166 and a nut 168 are engaged on the upper end part 170 of the stem 132, and the nut 168 is tightened to a degree sufficient to permit the frame 142 to swing about the stem 132 when a sufficiently strong force is applied to it, but to hold the frame 142 in position on the stem 132, in relation to the mounting 110, in normal circumstances.

Thus, when the mounting 110 is secured to the side 114 of a motor vehicle and the mirror frame 142 is fastened in position it will normally extend outwardly from the side of the vehicle 114, substantially at right angles to the direction of travel of the vehicle 114, but if struck by an obstacle it will swing rearwardly towards the side of the vehicle 114.

It may, of course, be returned to its initial position quite conveniently — merely by applying a force to the outer end of the mirror frame 142, in an outward and forward direction.

The mirror may conveniently be made in sets, right hand and left hands, so as to be capable of being mounted on the right hand side and the left hand side of a motor vehicle, in order that a driver of the vehicle may have a rearward vision from both right and left hand sides.

The frame 142 may be used to hold any type of mirror such as the manually operable mirror 172 shown in FIG. 2.

To refer now to FIG. 5, there is shown a retrovisor substantially identical to that of FIGS. 1 to 4, except that the mount 210 and the stem 232 are the one integral part. Furthermore, the stem 232 has a bore 280 therethrough and the mount 210 a hollow interior 282 to enable the passage therethrough of cables or wires 284 which are for a remotely controlled mirror. A hole 286 is provided in the surface 214 of the automobile and a gland or grommet 288 is placed in that hole 286 to enable the cables 284 to pass therethrough.

In FIG. 6 there is shown a further embodiment which, like the embodiment of FIG. 5, is identical to that of FIGS. 1 to 4 except that the mount 310 has a hollow interior 382 so that the nut 368, washer 366 and spring 364 may be located therein. To do this the stem 332 has an enlarged head 378 at the upper end 370 thereof which is adapted to engage on the upper surface of mounting block 354. The lower end 334 of stem 332 is screw threaded correspondingly to the nut 368. This embodiment would be eminently suitable where large and complex remote control mechanisms had to be contained within the frame 342.

The embodiment of FIG. 7 is different to that of FIGS. 1 to 4 in that the frame 442 has been modified. Here, the mounting block 454 is recessed into the frame 442 and a second mounting block 455, identical in all ways to block 454, is provided in the upper regions of frame 442. The two mounting blocks 454, 455 are in vertical alignment. By using this particular embodiment manufacturing costs may be reduced as the one frame 442 may be used for both right hand and left hand mirrors, the frame 442 only having to be turned up-side-down to enable this.

The frame may be made of metal, or of suitable plastics material.

Other modifications in details of design and/or construction may be made without departing from the ambit of the invention, the scope of which is to be ascertained from the following claims.

What I claim is:

1. A retrovisor for mounting on a vehicle, said retrovisor comprising:
    a frame member;
    a housing member adapted for ready engagement with the frame member to provide a mirror assembly for receiving and releasably retaining a reflective means; and
    a mounting member for mounting the mirror assembly on the vehicle, said mounting member including an annular plate located on the uppermost surface thereof, said plate having teeth means extending around the periphery of said plate, complementary teeth means being located on the frame member, said teeth means being adapted to engage with said complementary teeth means and oriented so as to allow the mirror assembly to be normally retained in a preset operating position and to cause said mirror assembly to pivot towards the vehicle in response to an application of a force applied to said assembly; wherein said complementary teeth means comprises an annular plate arranged on the lowermost surface of a mounting block provided on the frame member; wherein said mounting block has a centrally disposed circular aperture therein and is recessed into the frame member; and wherein there is provided on the frame member a second mounting block which is substantially in vertical alignment with the first-mentioned mounting block.

2. A retrovisor as claimed in claim 1 wherein the frame member has a rear edge, with a bead being provided at the rear edge, the frame member further including at least one bow member extending rearwardly of and for the depth of the frame member.

3. A retrovisor as claimed in claim 1 wherein said teeth means is oriented in a substantially horizontal plane.

4. A retrovisor as claimed in claim 1 wherein the frame member and the mounting member are held together by means of a stem which is in turn provided with spring means whereby to bias the complementary teeth means on the frame member and the teeth means mounting member into mutual engagement.

5. A retrovisor as claimed in claim 4 wherein the stem has a screw-threaded lower end adapted to be received in a screw-threaded blind bore provided in the mounting member, and wherein the stem further has a screw-threaded upper end adapted to receive a nut whereby to retain the spring means on the stem.

6. A retrovisor as claimed in claim 4, wherein the stem is integral with the mount, the stem having a screw-threaded upper end for receiving a nut so as to retain the spring in the stem.

7. A retrovisor as claimed in claim 4, wherein the stem has an enlarged head at an upper end thereof so as to engage on the frame, and a screw-threaded lower end receivable in a hollow in the mount, the lower end being adapted to receive a nut so as to retain the spring in the stem.

* * * * *